March 20, 1945.　　W. H. GRAVES　　2,371,614
ENGINE CONNECTING RODS AND METHOD OF SECURING PARTS TOGETHER
Filed Dec. 31, 1942
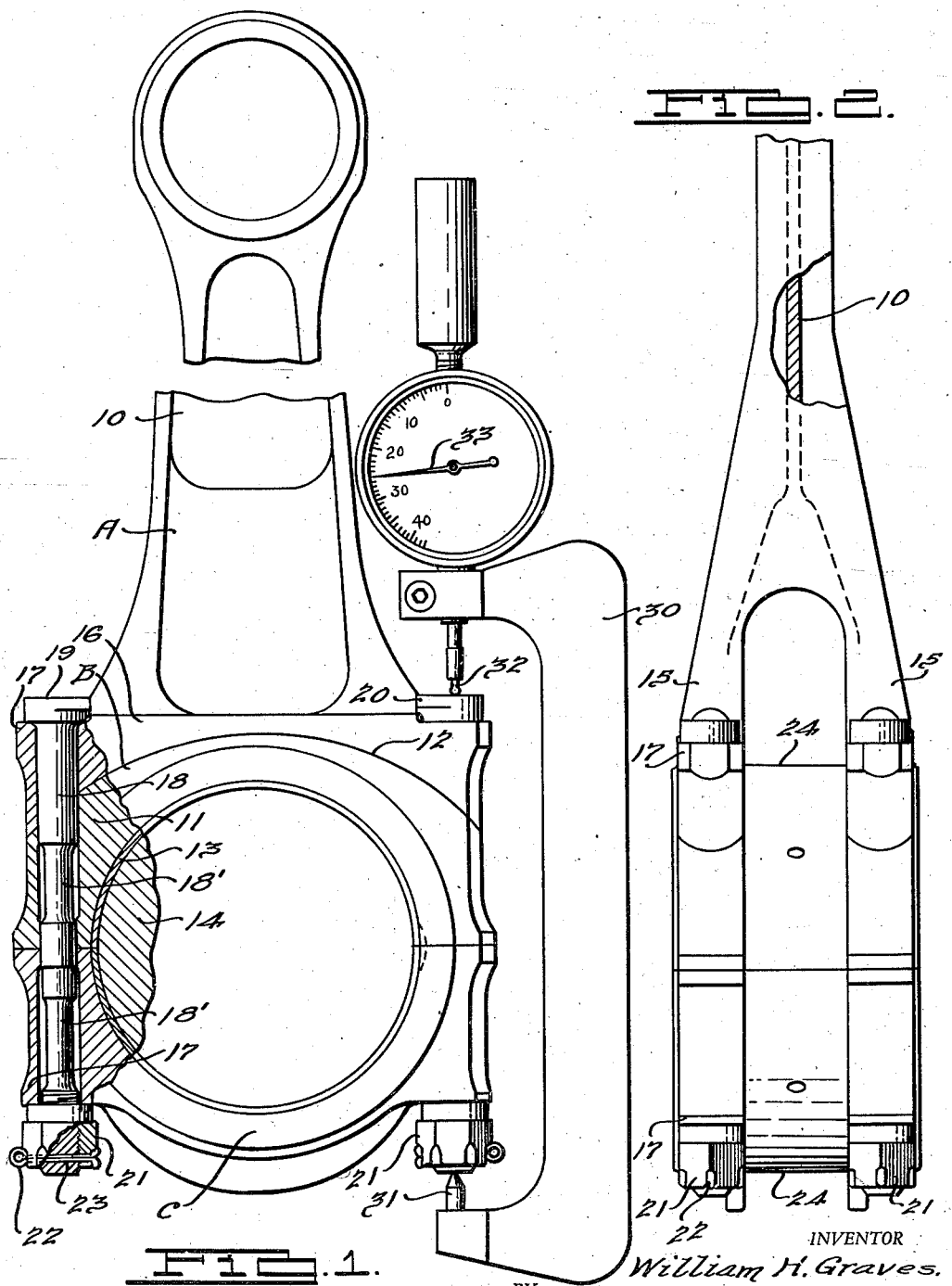
INVENTOR
William H. Graves.
BY
ATTORNEY Patented Mar. 20, 1945

2,371,614

UNITED STATES PATENT OFFICE 2,371,614

ENGINE CONNECTING ROD AND METHOD OF SECURING PARTS TOGETHER

William H. Graves, Huntington Woods, Mich., assignor to Packard Motor Car Company, Detroit, Mich., a corporation of Michigan Application December 31, 1942, Serial No. 470,725

10 Claims. (Cl. 74—579)

This invention relates to connecting rods for engines, particularly high speed internal combustion engines such as used in aircraft and to the method of securing parts together. It relates to connecting rods of the type in which the big end of the rod is split crosswise to form an arched bearing portion and a cap bearing portion bolted together by two or more bolts, usually clamping a two-part bearing sleeve between them. In V-type engines there are usually forked rods each having two separated bearing portions, and consequently four bolts, and blade rods each having its single bearing between the two bearing portions of a forked rod.

Lightness in aircraft engines, particularly for war planes, is of course of the utmost importance and consequently all parts of the engine are scaled down to minimum weight. Of even more importance is the reduction in weight of the reciprocating parts of such engines, particularly the pistons and connecting rods. At the high speeds at which these engines operate, 3600 R. P. M. or more, the loads on the connecting rods are considerable and if the bolts are not properly tightened the cap may move away from the arched portion of the rod and thereby bend a bolt or bend the arch of the rod, resulting in fatigue and failure. This is another way of saying that the factor of safety designed into the stressed parts of the engines of war planes is much less than in other engines and consequently it is necessary that the stress of every part be most carefully determined and considered in order to avoid that failure which means so much in this particular engine use.

It is the very general practice in assembling engine connecting rods to use a torque wrench for tightening the nuts of the bolts, and while it is recognized that this method of tightening nuts is not entirely accurate, due to differences in friction between the parts used, it has been satisfactory for a long time on engines designed with the usual factor of safety, and the failures have not been frequent or generally fatal. But in the use of this method of assembling connecting rods in an aircraft engine stepped up from production of a few engines per month to a relatively large assembly line production it has been found that some bolts, no matter how carefully tightened with a torque wrench, are not tight enough to withstand the load to which they are subjected in the gruelling tests which they undergo. Examination of connecting rod failures definitely indicates this lack of tightness on the part of some of the bolts, the bearing cap evidently having separated from the arched portion of the connecting rod, fatigue and failure resulting.

It has been very generally assumed that fastening bolts should not be tightened or stretched beyond their elastic limit, that is, should not be given a permanent set. It has been thought that this prestrained condition would cause fatigue failure and that the practice therefore would be unjustified. Consequently bolts have been designed of such dimensions as not to require initial tightening up to or beyond the elastic limit.

But by this invention the connecting rod bolts are so designed that they are very close to their elastic limit when in the tightening process there is sufficient combined load on the bolts to offset the load imposed on them in the operation of the engine. So by tightening the bolts in the initial step of the process to a point where they are stretched to approximately their elastic limit it is known that they are then sufficiently tight to carry the load. The nuts are then additionally turned to bring the hole in the bolt end into alignment with the next slot in the castellated nut whereby the cotter pin may be inserted to lock the nut and yet the load on the bolt, because of the latter being stretched beyond its elastic limit, will not be appreciably increased.

One of the objects of the present invention is to so stretch the bolts of a connecting rod that they will have known and ample tightness and the nuts may be secured against turning back.

Another of the objects of the invention is to remedy the unequal and inadequate tightening of connecting rod bolts and consequently to lessen greatly the chance of failure.

Another object of the invention is to assure the tightening of the nuts of connecting rod bolts to a point where the combined load thus produced on the bolts of a connecting rod will exceed the maximum load on the rod at the maximum horsepower or speed of the engine.

Another object of the invention is to provide connecting rods with bolts having substantially equal load or stretch characteristics and sufficiently loaded or stretched to insure against fatigue failure.

Other objects of the invention will appear from the following description taken in connection with the drawing, which forms a part of this specification, and in which:

Fig. 1 is a front elevation of an engine connecting rod made in accordance with the invention, parts being broken away to show the bolt construction, and a dial indicator gage being shown in position for measuring the stretch of a bolt; and Fig. 2 is a side elevation of the rod shown in Fig. 1.

For the purpose of illustrating the invention a connecting rod of the forked type is shown and when this rod is used in a V-type engine the blade rod thereof is journalled on the bearing of the forked rod between the forks of that rod. The blade rod is not shown in the drawing.

The connecting rod illustrated comprises three principal parts, A, B, and C. The parts A and B together form the main shank or rod portion 10 and the arched portion 11 of the connecting rod, these parts being joined on the curve 12. The part C is the cap or bearing block of the connecting rod and is shaped similar to the part B and joined thereto to form the complete bearing portion of the rod. Within this bearing portion of the connecting rod there is the usual split bearing sleeve 13 on the rod bearing portion 14 of the crankshaft of the engine.

The shank of the connecting rod is forked as shown at 15 and each of these forks is formed with an arched portion 16 which bears upon the part B of the connecting rod and is bolted thereto by the same bolts that secure the cap or block C to the part B. That portion of the parts B and C which is arranged between the forks 15 forms a cylindrical bearing 24 for the blade connecting rod (not shown) when used in a V-type engine. This cylindrical bearing 24 is ground to size by clamping the parts B and C together before connecting them to the part A.

The arched portion of the connecting rod and the part C are formed with ears 17, and these ears and the adjacent portions of the parts B and C are drilled to form four bolt holes for the four bolts 18. Each bolt has a head 19 formed with a nib 20 which prevents it from turning, and at the threaded end of the bolt there is a nut 21 for tightening the bolt and drawing the three parts A, B, and C, together. In the drawing, a portion of one of the nuts is cut away to show a cotter pin 22 passing through a drilled hole 23 in the bolt and through the slots of the castellated nut, to lock the nut in position. One or more portions of each bolt between its ends is made of smaller diameter than the threaded portion, as shown at 18', so that when the bolt is stretched, as hereinafter described, these portions instead of the threaded portions will partake of most of the elongation.

From the above it will be seen that when the four bolts are tightened by threading the nuts thereon the cap C is drawn against and secured to the arched portion 11 of the connecting rod and the parts A and B of the rod are also securely fastened together. Also it will be seen that any looseness of the bolts, in the operation of the engine, will permit the cap to separate from the arched portion of the rod and thus tend to bend or stress a bolt or bend the arched portion and possibly cause breakage of one of those parts. But by the method and construction of this invention the bolts are so designed and tightened that even at the greatest load put on the connecting rod in the operation of the engine the cap will not leave its seat and therefore the stress range of the bolt is substantially reduced and breakage is eliminated.

The invention is practiced in one instance in a V-type engine of substantially five-inch bore and five-inch stroke and the connecting rod big end surrounds a crankshaft bearing of substantially three inches in diameter. Each of the four bolts of the connecting rod is approximately ⅜ of an inch in diameter where threaded and ¼ inch at the reduced portions, and is about four inches long. All four bolts are made of the same design so that they will all stretch to the same degree by a given pull and bolts of this design are previously tested to determine the load-stretch characteristics thereof and particularly to determine the stretch required to reach the elastic limit of the bolt so that the stretch of such bolts will be a true indicator of the load. This, coupled with the definite stretching of the bolts hereafter described, makes for known tightness of all four corners of the connecting rod big end and insures against the cap leaving the rod and therefore against failure.

In assembling the parts of such a connecting rod, the nut of each bolt is threaded on by hand or lightly by a wrench until its abuts the ear 17 and then a dial indicator gage such as shown at 30 is adjusted on the bolt with its anvil 31 at one end and its movable point 32 at the other end of the bolt. The gage dial then indicates by the hand 33 a certain point thereon which may be said to be the length of the bolt in its natural state. With the gage in this position the nut 21 is turned and the bolt thereby stretched to the measured degree corresponding approximately to the elastic limit of the bolt, that is, the bolt is stretched until the hand 33 indicates that the bolt has reached its elastic limit as predetermined by testing similar bolts as indicated above. In the bolt described this point is reached at an indicated stretch of .007 or .008 inch. After this has been accomplished with all four bolts the combined pre-load on the bolts, in such a connecting rod, is known to be greater than any load the connecting rod will be subjected to at its maximum operation.

Connecting rod bolt nuts are usually secured to the bolts by cotter pins; thus the need for alignment between slots in the nuts and the hole in the bolt. The maximum amount of tightening to get this alignment is something less than one "hex" of the nut. Since the bolt has been stretched to its elastic limit the nut must not be backed off but instead it is further tightened to bring about this alignment with the next slot in the nut. In the construction shown this may further stretch the bolt as much as .006 inch. While backing off the nut would decrease the bolt load this tightening does not appreciably increase it.

In the particular bolts shown and described herein by way of example, there could be as shown above, a maximum stretch of .007 or .008 inch plus .006 inch, or a total of .013 or .014 inch. This has been definitely determined not to be detrimental and in fact a stretch of .010 inch per inch of bolt length is allowable since it is appreciably less than the point of failure.

While I have herein described in some detail a specific embodiment of my invention, which I deem to be new and advantageous and may specifically claim, I do not desire it to be understood that my invention is limited to the exact details of the method and construction described, as it will be apparent that changes may be made therein without departing from the spirit or scope of my invention.

What is claimed is:

1. The method of securing a connecting rod cap to its rod which includes the steps of assembling the rod parts and bolts and then stretching the connecting rod bolts to a point beyond their predetermined elastic limit but appreciably less than their point of failure.

2. The method of securing a connecting rod cap to its rod which includes the steps of determining the load-stretch characteristics of the bolts, then assembling the rod parts and bolts, and then stretching the rod bolts to a point beyond their elastic limit but appreciably less than their point of failure.

3. The method of securing a bearing block to its connecting rod comprising the step of assembling the block, rod and bolts, the step of tightening all of the bolt nuts to a predetermined and equal measured stretch of the bolts to or slightly beyond their elastic limit and the step of turning the nuts tighter to bring the cotter pin hole in each bolt in line with next slot in its nut.

4. An engine connecting rod split at the big end and having bolts securing the bearing cap to the arched portion of the rod, said bolts being in a stretched state such that the maximum load applied at the maximum horsepower of the engine is less than the combined preload on the bolts and such that the stretch of the individual bolts is beyond their predetermined elastic limit but is not more than .010 inch per inch of length of bolt.

5. The method of securing a connecting rod cap to its rod which includes the step of assembling the rod parts and bolts the step of stretching the connecting rod bolts to approximately their predetermined elastic limit and the further step of additionally stretching the bolts beyond their elastic limit by turning the nuts tighter to bring the cotter pin hole in each bolt in line with next slot in its nut.

6. An engine connecting rod split at the big end and having bolts securing the bearing cap to the arched portion of the rod, all of said bolts being stretched to at least their predetermined elastic limit but appreciably less than their point of failure.

7. An engine connecting rod split at the big end and having bolts securing the bearing cap to the arched portion of the rod, all of said bolts being stretched to at least their predetermined elastic limit but appreciably less than their point of failure, and the combined stretch of the bolts producing a bolt load greater than the maximum load on the rod at the maximum horsepower of the engine in which the rod is used.

8. The method of securing a connecting rod cap to its rod which includes the steps of (a) testing and measuring connecting rod bolts of a given design to determine the stretch required to reach the elastic limit, (b) assembling the rod parts and bolts, and (c) stretching the bolts by tightening to a point beyond their elastic limit but appreciably less than their point of failure.

9. The method of securing two separately formed parts together by a bolt comprising the steps of (a) predetermining the load-stretch characteristics of the connecting bolt, (b) assembling the parts and bolt in position for tightening, and (c) tightening the bolt nut and stretching the bolt to a point beyond its elastic limit but appreciably less than its point of failure.

10. The method of securing two separately formed parts together by a bolt comprising the steps of (a) predetermining the load-stretch characteristics of the connecting bolt, (b) assembling the parts and bolt in position for tightening, (c) tightening the bolt nut and stretching the bolt to a point beyond its elastic limit but appreciably less than its point of failure, and (d) turning the nut farther to bring the cotter pin hole in the bolt in line with the next slot in the nut, and (e) inserting a cotter pin through the nut and bolt.

WILLIAM H. GRAVES.